United States Patent
Kuruvilla

(10) Patent No.: US 9,135,727 B2
(45) Date of Patent: Sep. 15, 2015

(54) METHOD AND APPARATUS FOR RECONSTRUCTING INDEXED COLOR SPACES

(71) Applicant: Adobe Systems Incorporated, San Jose, CA (US)

(72) Inventor: Ashok Mathew Kuruvilla, Ernakulam (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 94 days.

(21) Appl. No.: 13/888,761

(22) Filed: May 7, 2013

(65) Prior Publication Data

US 2014/0334725 A1 Nov. 13, 2014

(51) Int. Cl.
G06T 11/00 (2006.01)

(52) U.S. Cl.
CPC .................................. *G06T 11/001* (2013.01)

(58) Field of Classification Search
CPC ............................. G06T 11/001; H04N 1/6033
USPC .......... 382/166, 232, 162; 345/600, 442, 601, 345/589; 358/581, 1.9; 707/700
See application file for complete search history.

(56) References Cited

U.S. PATENT DOCUMENTS

| | | | | |
|---|---|---|---|---|
| 5,343,311 A * | 8/1994 | Morag et al. | | 358/518 |
| 5,592,591 A | 1/1997 | Rolleston | | |
| 6,026,411 A * | 2/2000 | Delp | | 707/700 |
| 6,961,460 B2 * | 11/2005 | Nagai et al. | | 382/162 |
| 7,068,398 B2 | 6/2006 | Rijavec | | |
| 7,403,661 B2 | 7/2008 | Curry et al. | | |
| 7,714,873 B2 | 5/2010 | Flavell et al. | | |
| 7,895,513 B1 | 2/2011 | Puri et al. | | |
| 8,218,908 B2 | 7/2012 | Ilbery | | |
| 8,331,663 B2 | 12/2012 | Subramaniam | | |
| 8,599,214 B1 * | 12/2013 | Dall et al. | | 345/601 |
| 2002/0089514 A1 * | 7/2002 | Kitahara et al. | | 345/600 |
| 2003/0103669 A1 * | 6/2003 | Bucher | | 382/162 |
| 2003/0198380 A1 * | 10/2003 | Shin et al. | | 382/165 |
| 2006/0267985 A1 * | 11/2006 | Brodie et al. | | 345/442 |
| 2007/0237404 A1 * | 10/2007 | Strom | | 382/232 |
| 2009/0010533 A1 * | 1/2009 | Hung | | 382/166 |
| 2009/0284766 A1 * | 11/2009 | Yajima | | 358/1.9 |
| 2009/0315905 A1 | 12/2009 | Lu et al. | | |
| 2010/0141670 A1 * | 6/2010 | Cohen et al. | | 345/589 |

FOREIGN PATENT DOCUMENTS

WO    WO 94/30002    12/1994

* cited by examiner

*Primary Examiner* — Mekonen Bekele

(74) *Attorney, Agent, or Firm* — Keller Jolley Preece

(57) ABSTRACT

A computer implemented method and apparatus for reconstructing indexed color spaces. The method comprises accessing a plurality of indexed color spaces, wherein each indexed color space comprises a bit depth; and creating one or more unions of two or more indexed color spaces from the plurality of indexed color spaces, wherein the bit depth of the union of the two or more indexed color does not exceed the bit depth of any of the two or more indexed color spaces.

21 Claims, 4 Drawing Sheets

METHOD AND APPARATUS FOR RECONSTRUCTING INDEXED COLOR SPACES

BACKGROUND OF THE INVENTION

1. Field of the Invention

Embodiments of the present invention generally relate to indexed color spaces and, more particularly, to a method and apparatus for reconstructing indexed color spaces.

2. Description of the Related Art

Many image container formats, such as Tagged Image File Format (TIFF), Portable Document Format (PDF), PHOTOSHOP® Document (PSD), ADOBE® ILLUSTRATOR® (AI), and the like, hold multiple images, each with its own indexed color space. The use of multiple indexed color spaces typically results in the image container including redundant color information. For example, an image container may hold an ADOBE® PHOTOSHOP® image. Each layer of a PHOTOSHOP® image is stored as an image stream. Similarly, each image included in a PDF is an image stream. When an image stream is encoded, color information may not be directly carried by the image pixel data, but is stored in a separate piece of data called a palette or an indexed color space. The palette is an array of unique color elements, in which every color element is identified by its position within the array. Accordingly, it is not necessary that each pixel of an image stream contain an independent and full specification of its color, and instead each image pixel need only refer to a position within the palette where its unique color is located. Hence, the palette is used as an index to look up the full specification of the color for that pixel. Since each image stream includes its own indexed color space, when an image container includes multiple image streams, redundant color specification information is often maintained. Redundancy of color information in image containers unnecessarily and undesirably increases the size of the overall image data stored in the given image container.

Currently, attempts to reduce redundancy include quantizing all of the colors to fit a palette by using, for example, color diffusion, and then indexing the resulting reduced color space. However, color quantization techniques result in the loss of important color information, and often deteriorate the original image after transformation.

Therefore, there is a need for a method and apparatus for reconstructing indexed color spaces.

SUMMARY OF THE INVENTION

A method and apparatus for reconstructing indexed color spaces substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
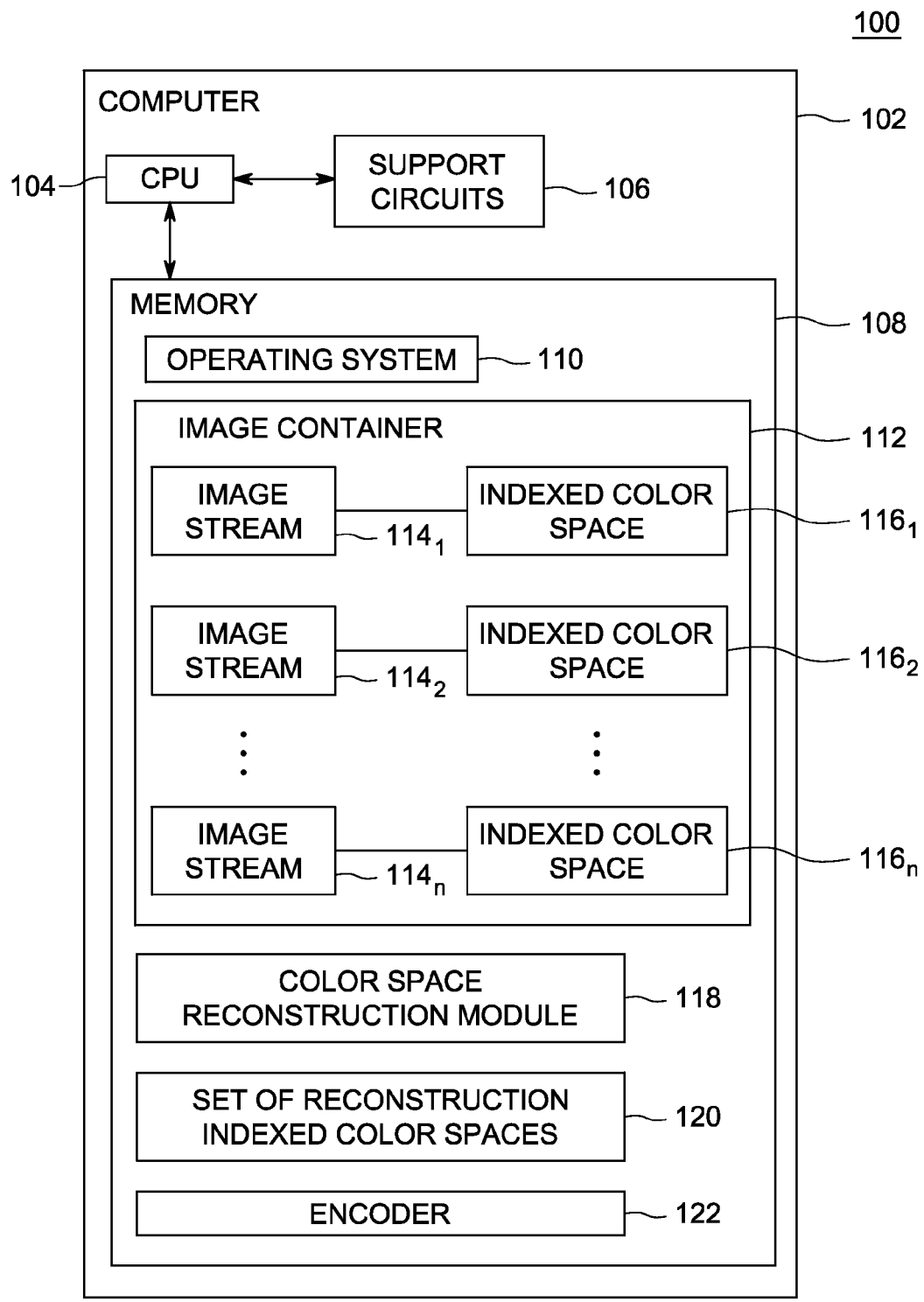
FIG. 1 is a block diagram of a system for reconstructing indexed color spaces, according to one or more embodiments.

While the method and apparatus is described herein by way of example for several embodiments and illustrative drawings, those skilled in the art will recognize that the method and apparatus for reconstructing indexed color spaces is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for reconstructing indexed color spaces defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for reconstructing indexed color spaces. The embodiments create a set of all of the indexed color spaces in an image container. Each indexed color space has a bit depth. A bit depth is the number of bits used to indicate the color of a single pixel. For example, a monochrome image has a bit depth of 1 because $2^1=2$ colors, often black and white. An image that may be represented using 4 colors has an indexed color space with a bit depth of 2 ($2^2=4$ colors), and so on. Embodiments of the present invention reconstruct indexed color spaces. However, in reconstructing the indexed color spaces, the bit depth of the reconstructed color spaces is never increased. As such, the size of the color space in never increased while at the same time, never removing a color that is used to represent an image stream. Thus, the reconstructed indexed color space can be used to reconstruct the original image without loss or deterioration of color information.

The method groups the indexed color spaces (ICSs) associated with the individual image streams, and sorts them in a predefined order, for example, descending order based on the number of colors contained in the ICS. This is referred to as the sorted group. The first ICS is moved to a new group. In the sorted group, starting at the top, the method finds the ICS in which (i) the bit depth of the union of the ICS and all ICSs in the new group does not exceed the bit depth of any ICS in the union, and (ii) the ICS should have maximum intersection with the union of all ICSs in the new group. If an ICS that satisfies the conditions is found, it is moved into the new group and the sorted group is searched again. If an ICS that satisfies the conditions is not found, a new ICS is constructed from the union of all of the ICSs in the new group that is created. The above process iterates until all ICSs from the sorted group have been moved to a new group, and reconstructed as new ICSs. The image streams are then re-encoded using the resulting new ICSs that are generated out of the image stream's original ICS.

Advantageously, the present invention produces a significant size reduction of the overall image data without any deterioration or color information loss of the source image streams. The present invention may be used as a plug-in to any tool or software application involving color spaces. For example, when an ADOBE® Portable Document File (PDF) or an ADOBE® PHOTOSHOP® document is opened, the present invention reconstructs the color spaces of the images contained in the document, thereby reducing the size of the image data that is stored without affecting the color of the images.

Various embodiments of a method and apparatus for reconstructing indexed color spaces are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for reconstructing indexed color spaces, according to one or more embodiments. The system 100 includes a computer 102. The computer 102 includes a Central Processing Unit (CPU) 104, support circuits 106, and a memory 108. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 108 includes at least one of Read Only Memory (ROM), Random Access Memory (RAM), disk drive storage, optical storage, removable storage and/or the like.

The memory 108 includes an operating system 110, an image container 112, a color space reconstruction module 118, a set of reconstructed indexed color spaces 120, and an encoder 122. The image container 112 contains a plurality of image streams $114_1$, $114_2$, ... $114_n$ (collectively referred to as 114) and a plurality of indexed color spaces $116_1$, $116_2$, ... $116_n$ (collectively referred to as 116). Each image stream 114 has a one-to-one correspondence with an indexed color space 116 for carrying the encoded color information. The operating system 110 may include various commercially known operating systems. The set of reconstructed indexed color spaces 120 contains a plurality of indexed color spaces (not shown), wherein the number of indexed color spaces in the set of reconstructed indexed color spaces 120 is less than the number of indexed color spaces 116 in the image container 112.

The color space reconstruction module 118 groups the indexed color spaces (ICSs) 116 and sorts them in descending order based on the number of colors contained in the ICS 116. The color space reconstruction module 118 then moves the first ICS 116 to a new group. In the sorted group, starting at the top of the descending order, the color space reconstruction module 118 finds the ICS 116 that meets the following criteria: the bit depth of the union of the ICS 116 and all ICSs in the new group does not exceed the bit depth of any ICS 116 used to form the union, and the ICS 116 should have maximum intersection of colors contained in the ICS 116 with the union of all ICSs in the new group. If an ICS 116 that satisfies these conditions is found, the color space reconstruction module 118 moves that ICS 116 into the new group and the sorted group is searched again. If an ICS 116 that satisfies the conditions is not found, the color space reconstruction module 118 applies a union operation on the current group to construct a new ICS. The color space reconstruction module 118 stores the resulting new ICS in the set of reconstructed color spaces 120, and creates a new group. The process iterates until all ICSs from the sorted group have been reconstructed as new ICSs, and stored in the set of reconstructed indexed color spaces 120. The encoder 122 then re-encodes the image streams 114 using the ICS 120 generated out of the union of the image stream's original ICS 116.

Figure 2:
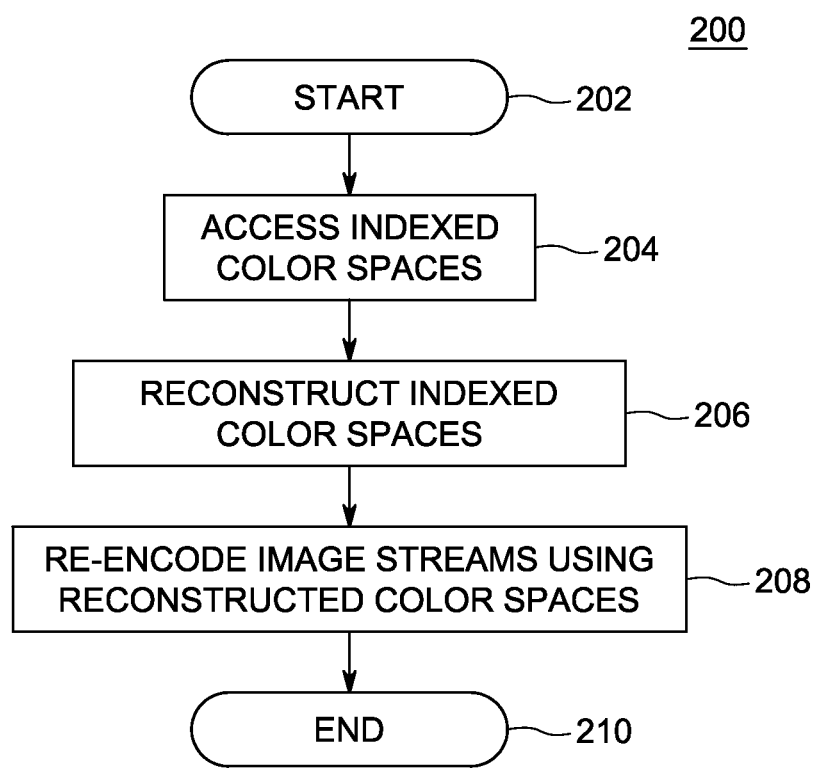
FIG. 2 is a flowchart of a method for encoding multiple image streams using reconstructed indexed color spaces as performed by the color space reconstruction module and the encoder of FIG. 1, according to one or more embodiments.

FIG. 2 is a flowchart of a method 200 for encoding multiple image streams using reconstructed indexed color spaces as performed by the color space reconstruction module 118 and the encoder 122 of FIG. 1, according to one or more embodiments. The method 200 removes redundant color information in color spaces and re-encodes the image streams using the reconstructed indexed color spaces. The method 200 starts at step 200 and proceeds to step 204.

At step 204, the method 200 accesses a plurality of indexed color spaces. A user may open a document, for example, a PDF document, that contains two or more image streams (or images). Each image stream in an image container has an indexed color space that is used to reconstruct that image stream. However, maintaining an indexed color space for each image stream of multiple image streams may result in the storage of a significant amount of redundant color information. Ideally, subsets of the indexed color spaces can be combined to produce fewer indexed colors spaces that may be shared by multiple image streams.

The method 200 proceeds to step 206, where the method 200 reconstructs the indexed color spaces as described in further detail with respect to FIG. 3 below. The indexed color spaces of the opened document are combined in a way that removes redundant color information, thereby using substantially less computer memory. The method 200 proceeds to step 208, where the method 200 re-encodes the images streams using the reconstructed indexed color spaces.

The method 200 re-encodes each image stream using the reconstructed indexed color space that was generated out of the union containing the image stream's original indexed color space. The image streams in the opened document are re-encoded. Each image stream may be associated with a new indexed color space created by combining one or more indexed color spaces. To the user, the image streams within the document are unchanged, however, the reconstructed colors spaces requires substantially less computer memory. The method 200 proceeds to step 210 and ends.

Figure 3:
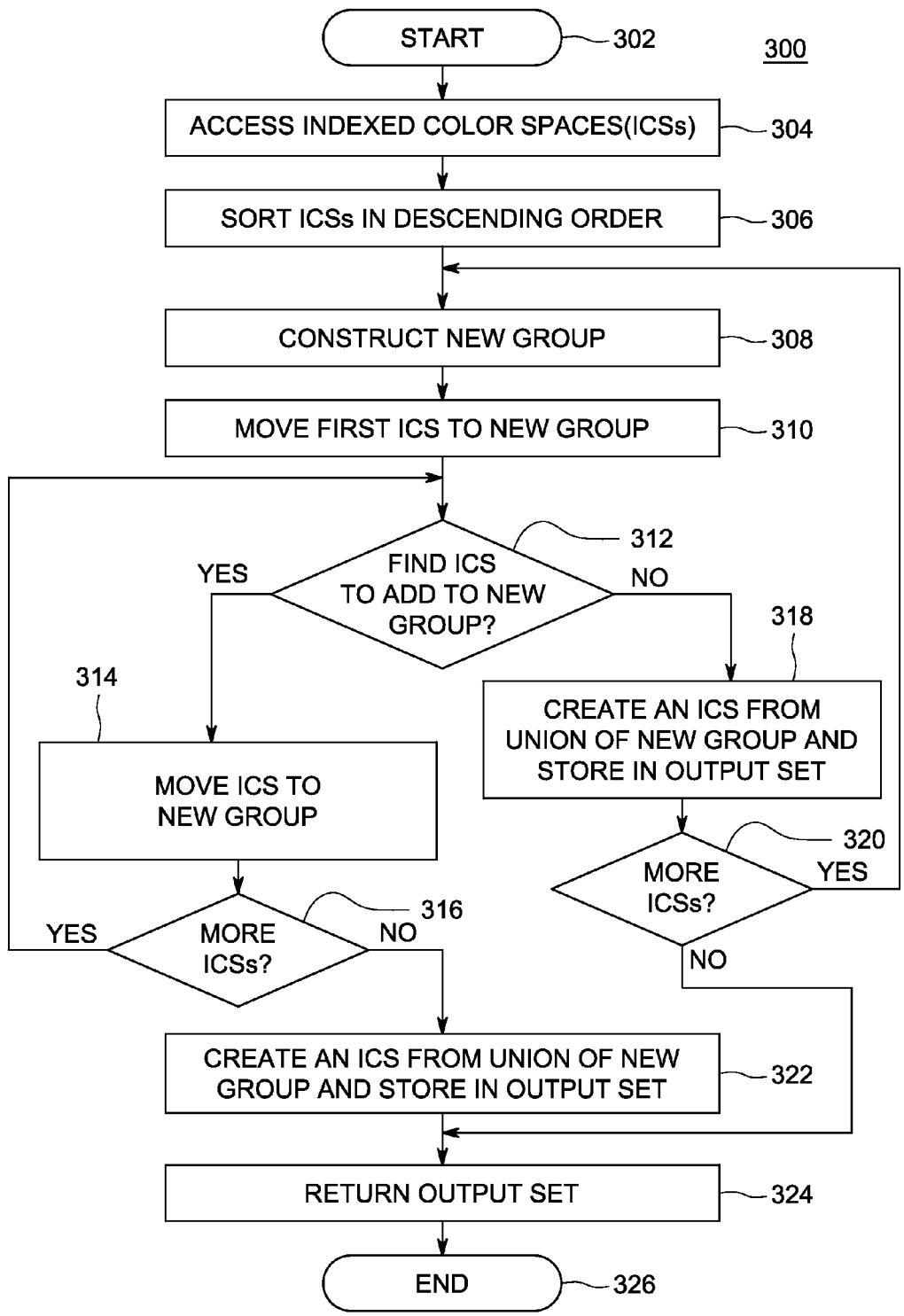
FIG. 3 is a flowchart of a method for reconstructing indexed color spaces as performed by the color space reconstruction module of FIG. 1, according to one or more embodiments.

FIG. 3 is a flowchart of a method 300 for reconstructing indexed color spaces as performed by the color space reconstruction module 118 of FIG. 1, according to one or more embodiments. The method 300 determines which indexed color spaces may be combined in order to decrease redundancy of color information in an image container. The method 300 starts at step 302 and proceeds to step 304.

At step 304, the method 300 accesses a plurality of indexed color spaces in an image container. Although multiple image streams in an image container may contain similar colors, each image stream has its own indexed color space (ICS). The method 300 proceeds to step 306, where the method 300 sorts the ICSs into a group in descending order based on the number of colors in each of the ICSs. Each ICS may have a different number of colors. For example, a monochrome image would have only 2 colors, while an elaborately colored image may have 256 colors. The number of colors contained in the ICS determines the bit depth for the image stream. The bit depth is the number of bits used to indicate a color of a pixel of an image. For example, an image with 2 colors has a bit depth of 1 because $2^1=2$ colors. An image represented by 256 colors has a bit depth of 8 because $2^8=256$.

The method 300 proceeds to step 308, where the method 300 constructs a new empty group. The new empty group is used to store ICSs that may be combined in order to decrease redundancy in the color spaces. The method 300 proceeds to step 310, where the method 300 moves the first ICS in the sorted ICSs into the new group. The first ICS is the ICS in the sorted group that contains the most colors.

The method 300 proceeds to step 312, where the method 300 searches for an ICS that may be combined with the ICSs in the new group. The method 300 searches the ICSs in descending order as they are positioned in the sorted group. In order to be added to the new group, two criteria must be met. The method 300 performs a union of the indexed color space with all of the indexed color spaces in the new group. The bit depth of the union must not exceed the bit depth of any individual indexed color space used to form the union. The indexed color space must also have the maximum intersection of colors in the indexed color space with the union of all indexed color spaces in the new group compared with all other color spaces in the sorted group.

If the method 300 finds an indexed color space that meets the criteria, the method 300 proceeds to step 314, where the method 300 moves the indexed color space to the new group to form a union with the indexed color spaces in the new group and the method 300 proceeds to step 316. At step 316, the method 300 determines whether there are more ICSs in the sorted group. If more ICSs exist in the sorted group, the method 300 proceeds to step 312. However, if at step 316 the method 300 determines that there are no more ICSs in the sorted group, the method 300 proceeds to step 322, where the method 300 creates an ICS from a union of the new group and stores the ICS in the output set. The method 300 proceeds to step 324.

However, if at step 312, the method 300 determines that there are no indexed color spaces in the sorted group that meet the criteria, the method 300 proceeds to step 318, where the method 300 creates an ICS from a union of the new group and stores the ICS in the output set. The output set is a set of reconstructed indexed color spaces. The method 300 proceeds to step 320, where the method 300 determines if there are more ICSs in the sorted group. If the method 300 determines there are more ICSs exist in the sorted group, the method 300 proceeds to step 308. However, if at step 320, the method 300 determines that no more ICSs exist in the sorted group, the method proceeds to step 324.

At step 324, the method 300 returns the output set of reconstructed indexed color spaces. The method 300 proceeds to step 326 and ends.

Figure 4:
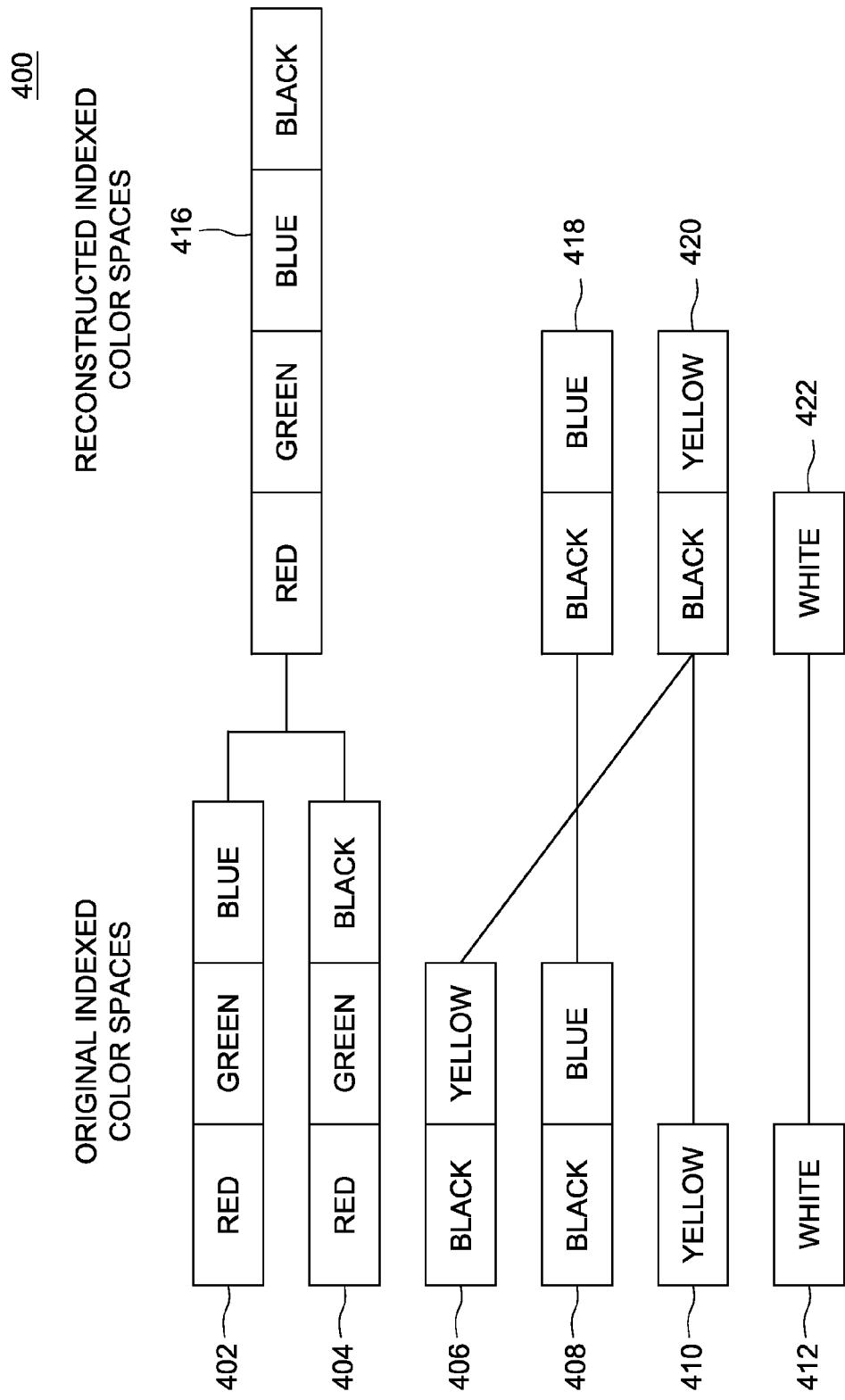
FIG. 4 depicts an illustration of using the method for reconstructing indexed color spaces, according to one or more embodiments.

FIG. 4 depicts an illustration 400 of using the method for reconstructing indexed color spaces, according to one or more embodiments. The original indexed color spaces 402, 404, 406, 408, 410, and 412 are grouped and then sorted in descending order according to how many colors are contained in the indexed color space.

The first indexed color space 402 is moved into a new group. The sorted indexed color space group now contains original indexed color space 404, 406, 408, 410, and 412. The sorted group is searched to find an indexed color space such that the bit depth of the union of the indexed color space does not exceed the bit depth of an individual indexed color space used to form the union. In addition, the indexed color space should have maximum intersection of colors in the indexed color space with the union of all indexed color spaces in the group.

The new group currently contains indexed color space 402. Color space 402 is made up of three colors, namely red, green, and blue. It has a bit depth of two because the three colors may be kept in a $2^2$ color space of 4 colors. The indexed color space 404 is determined to have 3 colors. A union of indexed color space 404 and the indexed color space in the new group, namely 402, contains four colors, specifically, red, green, blue, and black, as shown by color space 416. The bit depth of the union of the indexed color spaces is 2 because the four colors may be kept in a $2^2$ color space of 4 colors. Therefore, indexed color space 404 meets the first criteria; the bit depth of the union does not exceed the bit depth of any of the color spaces used to form the union.

However, the other original indexed color spaces must also be considered because others may meet the first criteria but also have a maximum intersection with the union of all indexed color spaces in the group, thereby satisfying the second criteria.

Indexed color space 406 cannot be used because the union of indexed color space 406 and the indexed colors space in the new group (containing color space 402), creates a color space with five colors, namely, red, green, blue, black and yellow. Five colors cannot be stored in a color space of bit depth 2. A color space with bit depth 2 can only hold 4 colors. The bit depth for five colors is 3. Therefore, the first criterion is not met.

Indexed color space 408, fails to meet the first criteria because the bit depth of the union is 2, while the bit depth of one of the indexed color spaces used to form the union, namely indexed color space 408, is 1. Indexed colors spaces 410 and 412 also fail to meet the first criteria. Therefore only indexed color space 404 meets both criteria and is added to the new group. The union creates a reconstructed color space 416.

The procedure is repeated with the remaining original indexed color spaces 406, 408, 410, and 412. Indexed color space 406 is moved to a new group. Indexed color space 408 does not meet the first criteria because a union of indexed colors spaces 406 and 408 creates a color space of 3 colors, which has a bit depth of 2, which exceeds the bit depths of both indexed color spaces 406 and 408. However, the union of indexed color space 410 with the indexed color space in the new group (406) creates a color space of two colors (black and yellow) with a bit depth of 1. The union of indexed color space 412 with the indexed color space in the new group (406) creates a color space of three colors (black, yellow, and white) with a bit depth of 2, thereby failing to meet the first criteria. Therefore, indexed color space 410 meets both criteria and is added to the new group. The union creates a reconstructed color space 420.

The remaining original indexed colors 408 and 412 cannot be combined because their union fails the meet the first criteria. Therefore, the indexed color space 408 is not combined and is moved to be reconstructed indexed color space 418. Similarly, the indexed color space 412 is not combined and is moved to be reconstructed indexed color space 422. Originally, six indexed color spaces existed with redundant color information. The six indexed color spaces were reduced to four reconstructed color spaces without increasing the bit depth of any color space and without removing any color from a color space.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   identifying a plurality of image streams to be encoded, wherein the plurality of image streams use at least two different indexed color spaces;
   accessing, by at least one processor, the plurality of indexed color spaces, wherein each indexed color space comprises a bit depth;
   creating, by the at least one processor, a reconstructed indexed color space comprising a union of a first indexed color space and at least a second indexed color space from the plurality of indexed color spaces upon determining that the first indexed color space has an intersection of colors with the at least a second indexed color space and a bit depth of the union of the first indexed color space and the at least a second indexed color space does not exceed the bit depth of any of the first and the at least a second indexed color spaces; and encoding, by the at least one processor, the plurality of images streams using the reconstructed indexed color space.

2. The method of claim 1, further comprising:
encoding a first image stream that uses the first indexed color space using the union of the first indexed color space and the at least a second indexed color space; and
encoding a second image stream that uses the second indexed color space using the union of the first indexed color space and the at least a second indexed color space.

3. The method of claim 1, wherein creating the reconstructed indexed color space comprises:
sorting the plurality of indexed colors spaces;
arranging the plurality of indexed color spaces in descending order;
adding an indexed color space of the plurality of indexed color spaces to the reconstructed indexed color space when it is determined that a union of the indexed color space with the indexed colors spaces in the reconstructed indexed color space does not increase the bit depth of any indexed color space in the reconstructed indexed color space and the indexed color space has the maximum intersection of colors of the indexed color spaces in the plurality of indexed color spaces with the union of all indexed colors spaces in the reconstructed indexed color space; and
creating a union of the indexed colors spaces in the reconstructed indexed color space.

4. The method of claim 1, wherein the plurality of image streams comprise a one-to-one correspondence to the plurality of indexed color spaces.

5. The method of claim 4, wherein the plurality of image streams comprise a many-to-one correspondence to unions of indexed color spaces in the reconstructed indexed color space.

6. The method of claim 2, wherein an image stream is encoded using the reconstructed indexed color space generated by the union of the first indexed color space and the at least a second indexed color space.

7. The method of claim 1, wherein the union of the first indexed color space and the at least a second indexed color space does not remove any color from the first indexed color space or the second indexed color space.

8. The method of claim 3, wherein arranging the plurality of indexed color spaces in descending order comprises arranging the plurality of indexed color spaces in descending order based on a number of colors in the index color spaces.

9. A non-transitory computer readable medium storing computer instructions that, when executed by at least one processor causes the at least one processor to perform a method for reconstructing indexed color spaces comprising:
identifying a plurality of image streams to be encoded, wherein the plurality of image streams use at least two different indexed color spaces;
accessing, by at least one processor, the plurality of indexed color spaces, wherein each indexed color space comprises a bit depth;
creating, by the at least one processor, a reconstructed indexed color space comprising a union of a first indexed color space and at least a second indexed color space from the plurality of indexed color spaces upon determining that the first indexed color space has an intersection of colors with the at least a second indexed color space and, a bit depth of the union of the first indexed color space and the at least a second indexed color space does not exceed the bit depth of any of the first and the at least a second indexed color spaces; and encoding, by the at least one processor, the plurality of images streams using the reconstructed indexed color space.

10. The computer readable medium of claim 9, wherein the method further comprises:
encoding a first image stream that uses the first indexed color space using the union of the first indexed color space and the at least a second indexed color space; and
encoding a second image stream that uses the second indexed color space using the union of the first indexed color space and the at least a second indexed color space.

11. The computer readable medium of claim 9, wherein creating the reconstructed indexed color space:
sorting the plurality of indexed colors spaces;
arranging the plurality of indexed color spaces in descending order;
adding an indexed color space of the plurality of indexed color spaces to the reconstructed indexed color space when it is determined that a union of the indexed color space with the indexed colors spaces in the reconstructed indexed color space does not increase the bit depth of any indexed color space in the reconstructed indexed color space and the indexed color space has the maximum intersection of colors of the indexed color spaces in the plurality of indexed color spaces with the union of all indexed colors spaces in the reconstructed indexed color space; and
creating a union of the indexed colors spaces in the reconstructed indexed color space.

12. The computer readable medium of claim 9, wherein the plurality of image streams comprise a one-to-one correspondence to the plurality of indexed color spaces.

13. The computer readable medium of claim 12, wherein the plurality of image streams comprise a many-to-one correspondence to unions of indexed color spaces in the reconstructed indexed color space.

14. The computer readable medium of claim 10, wherein an image stream is encoded using the reconstructed indexed color space generated by the union of the first indexed color space and the at least a second indexed color space.

15. The computer readable medium of claim 9, wherein the union of the first indexed color space and the at least a second indexed color space does not remove any color from the first indexed color space or the at least a second indexed color space.

16. The computer readable medium of claim 9, wherein arranging the plurality of indexed color spaces in descending order comprises arranging the plurality of indexed color spaces in descending order based on a number of colors in the index color spaces.

17. A computer-implemented method of reconstructing indexed color spaces to reduce redundancy of colors in the indexed color spaces comprising:
identifying a plurality of image streams to be encoded, the plurality of images streams using a plurality of different indexed color spaces;
identifying a first indexed color space from the plurality of indexed color spaces having the greatest number of colors;
forming, by at least one processor, a first union of the first indexed color space with any other indexed color spaces from the plurality of indexed color spaces:

when a bit depth of the first union does not exceed a bit depth of an individual indexed color space used to form the first union; and that has a maximum intersection of colors with the indexed color spaces in the first union compared with the other indexed color spaces from the plurality of indexed color spaces.

18. The method of claim 17, after forming the union, further comprising:

identifying a second indexed color space from the indexed color spaces of the plurality of indexed color spaces not in the first union having the greatest number of colors;

forming a second union of the second indexed color space with any other indexed color spaces from the plurality of indexed color spaces not in the first union:

such that a bit depth of the second union not exceed a bit depth of an individual indexed color space used to form the second union; and that has a maximum intersection of colors with the indexed color spaces in the second union compared with the other indexed color spaces from the plurality of indexed color spaces not in the first union.

19. The method of claim 17, further comprising encoding image streams of the plurality of image streams using the first union.

20. The method of claim 18, further comprising encoding image streams of the plurality of image streams using the first union and the second union.

21. The method of claim 18, further comprising combining the first union and the second union to form a group of reconstructed indexed color spaces.

* * * * *